United States Patent
Masudo et al.

(10) Patent No.: US 10,239,963 B2
(45) Date of Patent: Mar. 26, 2019

(54) MIXED SALT SUSPENSION POLYMERIZATION PROCESS AND RESINS AND CATALYSTS PRODUCED THEREOF

(71) Applicant: ROHM AND HAAS COMPANY, Philadelphia, PA (US)

(72) Inventors: Takashi Masudo, Natori (JP); Robert J. Olsen, Lansdale, PA (US); Garth R. Parker, Jr., Lansdale, PA (US); Jose A. Trejo, Lansdale, PA (US)

(73) Assignee: ROHM AND HAAS COMPANY, Philadelphia, PA (US)

(*) Notice: Subject to any disclaimer, the term of this patent is extended or adjusted under 35 U.S.C. 154(b) by 0 days.

(21) Appl. No.: 14/401,669

(22) PCT Filed: Jun. 7, 2013

(86) PCT No.: PCT/US2013/044631
§ 371 (c)(1),
(2) Date: Nov. 17, 2014

(87) PCT Pub. No.: WO2013/188221
PCT Pub. Date: Dec. 19, 2013

(65) Prior Publication Data
US 2015/0105487 A1 Apr. 16, 2015

Related U.S. Application Data

(60) Provisional application No. 61/657,817, filed on Jun. 10, 2012, provisional application No. 61/657,816, filed on Jun. 10, 2012.

(51) Int. Cl.
*C08F 2/18* (2006.01)
*C08F 2/20* (2006.01)
*C08F 2/44* (2006.01)
*C08F 4/04* (2006.01)

(52) U.S. Cl.
CPC .......... *C08F 2/18* (2013.01); *C08F 2/20* (2013.01); *C08F 2/44* (2013.01); *C08F 4/04* (2013.01)

(58) Field of Classification Search
CPC ........................................ C08F 2/18
See application file for complete search history.

(56) References Cited

U.S. PATENT DOCUMENTS

| | | | | |
|---|---|---|---|---|
| 2,540,984 A | * | 2/1951 | Jackson | C08F 20/08 210/683 |
| 3,991,017 A | | 11/1976 | Barrett et al. | |
| 4,224,427 A | * | 9/1980 | Mueller | A61K 9/1635 525/10 |
| 5,010,114 A | * | 4/1991 | Liang | C08F 2/18 521/109.1 |
| 5,932,152 A | * | 8/1999 | Podszun | C08F 2/18 264/4.1 |
| 2002/0155090 A1 | | 10/2002 | Takahashi et al. | |
| 2003/0225173 A1 | * | 12/2003 | Albright | C08J 9/20 521/51 |
| 2004/0034176 A1 | | 2/2004 | Bohling | |
| 2005/0124529 A1 | * | 6/2005 | Liu | C07C 233/38 510/499 |
| 2009/0176897 A1 | * | 7/2009 | Finch | B01J 39/20 521/38 |
| 2013/0209768 A1 | | 8/2013 | You et al. | |

FOREIGN PATENT DOCUMENTS

| | | |
|---|---|---|
| EP | 2151456 A1 | 2/2010 |
| GB | 1320219 A | 6/1973 |
| GB | 2082605 A | 3/1982 |
| JP | 2000239306 A | 9/2000 |
| JP | 2012-081440 | 4/2012 |

OTHER PUBLICATIONS

Xiao, H.; Xiao, H.X.; Frisch, K.C.; Malwitz, N. Kinetic studies of the reactions between isocyanates and carboxylic acids. High Perform. Polym. 6 (1994) 235-239.*

* cited by examiner

*Primary Examiner* — Michael M Dollinger
*Assistant Examiner* — Christina H Wales
(74) *Attorney, Agent, or Firm* — Kenneth Crimaldi; Carl Hemenway

(57) ABSTRACT

This invention relates to no-salt and mixed salt suspension polymerization processes for water-soluble monomers and resins and relates to catalysts produced from the same.

2 Claims, No Drawings

MIXED SALT SUSPENSION POLYMERIZATION PROCESS AND RESINS AND CATALYSTS PRODUCED THEREOF

This invention relates to a no salt suspension or a mixed salt suspension polymerization processes for water-soluble monomers and resins and catalysts produced from the same.

Suspension polymerization is commonly conducted in an aqueous suspending medium, by suspending discrete droplets of monomer in the aqueous medium, initiating a free-radical polymerization, and continuing the polymerization until the suspended droplets have formed solid, spherical particles. Such particles, especially when formed by copolymerization of a monoethylenically unsaturated monomer and a polyethylenically unsaturated, crosslinking monomer, are particularly useful as intermediate materials in the production of ion exchange resins. Many common monomers, such as styrene, α-methylstyrene, methyl methacrylate, ethyl acrylate and the like, are not soluble in water, and thus are well suited to suspension polymerization. However, some monomers, as for example acrylic acid, methacrylic acid, hydroxyethyl methacrylate, acrylonitrile, acrylamide, methacrylamide, vinyl pyridine, dimethylaminoethyl methacrylate and the like, are soluble in water to a significant extent.

When suspension polymerization is attempted with a monomer which is partially or fully water soluble, monomer partitions into the aqueous phase. In the case of fully water-soluble monomers, the suspended droplets may never even form, and even where the droplets form, several undesired phenomena occur during polymerization, such as the occurrence of emulsion, "popcorn" or precipitation polymers in the aqueous phase, caused by dissolved monomer forming insoluble polymer which precipitates from solution, or the formation of particle agglomerates caused by the presence of soluble polymers in the aqueous phase. The agglomerates lead to a polymer product with poor hydraulic characteristics, and the presence of polymer in the aqueous phase also leads to fouling of process equipment.

Techniques known to those skilled in the art for suspension polymerization of water-soluble monomers include saturating the aqueous suspending medium with a salt, e.g. an inorganic salt such as sodium chloride or sodium sulfate, to reduce the solubility of the monomer in the aqueous medium. This helps reduce, but not eliminate, some of the undesired phenomena.

Most suspension stabilizers are unstable in a high-salt, aqueous phase, and thus do not adequately protect the monomer droplets, allowing them to agglomerate. Additionally, some inorganic salts, for instance, sodium chloride has found to be problematic. Often sodium chloride when used to saturate the aqueous suspending medium causes corrosion of the reactors and other polymerization equipment.

Surprisingly, the no-salt embodiment of the present invention solves this corrosion problem in the art by providing a suspension polymerization process that produces polymeric compounds without the need for a salt to reduce the solubility of the water-soluble monomer in the aqueous phase.

In the mixed-salt embodiment of the present invention, surprisingly it has been found that when specific mixed salt combinations are used to prepare polymers, the problems in the art are solved. Furthermore, it was surprisingly found that these resultant polymers when used as catalysts have been found to have little polymer build-up and thus have a cleaner surface as observed by scanning electron microscopy as compared to their counterparts that are made without these specific salt combinations.

The present invention provides a process for preparing a resin by suspension polymerization comprising:
i) forming an aqueous suspension, wherein the aqueous suspension comprises an aqueous phase and an organic phase, wherein the organic phase comprises
   a) a monomer phase;
   b) from 0.1 to 5 weight percent of a polymerization initiator; and
   c) at least one solvent or porogen
wherein the monomer phase comprises at least 50 weight percent of one water-soluble monomer and from 0.1 to 50 weight percent of a crosslinking monomer;
ii) establishing polymerization conditions in the suspension,
iii) allowing the monomers to polymerize until they have formed water-insoluble particles,
and iv) separating the particles from the aqueous phase;
further wherein the aqueous suspension either does not comprise salt phase or else comprises a mixed salt wherein the mixed salt comprises sodium nitrite.

The aqueous phase of the present invention comprises water, from 0.01 to 4 weight percent of a suspending agent, and either comprises no salt or else comprises a mixed salt. The organic phase comprises a monomer phase wherein the monomer phase comprises at least 50 weight percent, based on the total monomer weight, of one water-soluble monomer from 0.1 to 50 weight percent, based on the total monomer weight, of a crosslinking monomer, and optionally a minor amount of an additional, non-water soluble copolymerizable monomer. The organic phase also comprises from 0.1 to 5 weight percent of a polymerization initiator and at least one solvent or porogen.

The water-soluble monomers useful in the present invention include, but are not limited to, acid monomers such as acrylic, methacrylic, itaconic, maleic, fumaric and crotonic acids and the like, water-soluble anhydrides such as acrylic anhydride and methacrylic anhydride, amino-substituted acrylamides and methacrylamides such as dimethylaminopropyl methacrylamide, dimethylaminoethyl methacrylamide, dimethylaminopropyl acrylamide, dimethylaminoethyl acrylamide, N,N-bis-(dimethylaminoethyl) methacrylamide, N,N-bis-(dimethylaminopropyl) acrylamide, N,N-bis-(dimethylaminoethyl) acrylamide, and N,N-bis-(dimethylaminopropyl) methacrylamide; amino-substituted acrylates and methacrylates such as dimethylaminoethyl methacrylate, dimethylaminopropyl methacrylate, dimethylaminoethyl acrylate and dimethylaminopropyl acrylate; hydroxyalkyl acrylates and methacrylates such as hydroxyethyl acrylate, hydroxyethyl methacrylate, hydroxypropyl methacrylate and hydroxypropyl acrylate; other nitrogen-substituted, water-soluble monomers such as acrylonitrile, vinyl pyridines, vinyl phosphonic acid, phosphoethyl methacrylate, vinylbenzyl pyrrolidone, N-vinyl-2-pyrrolidone and the like; or mixtures thereof. The water-soluble monomer is present in the monomer mixture as the major component; that is, the water-soluble monomer or monomers are present at a level of at least 50 weight percent of the total monomers, preferably the water-soluble monomer or monomers are present at 50 to 90 weight percent, more preferably 50 to 80 weight percent, and most preferably 50 to 75 weight percent. As used herein, the term "water-soluble", as applied to monomers, indicates that the monomer has a water solubility of at least one weight percent or greater; that is, at least one gram of the monomer will dissolve in 100 g of water measured at 20° C. Preferably, the water solubility of the monomer is at least 2 grams in 100 grams of water, and more preferably the water solubility is at least 5 grams in 100 grams of water measured at 20° C.

Crosslinking monomers useful in the present invention include both water-soluble and water-insoluble crosslinkers, including aromatic crosslinkers such as divinylbenzene, trivinylbenzene, divinylnaphthalene, divinyltoluene, divinylchlorobenzene, diallyl phthalate, divinylxylene, divinylethylbenzene, trivinylnaphthalene, polyvinylanthracenes and the like, and aliphatic crosslinkers such as diethyleneglycol divinyl ether, trimethylolpropane trimethacrylate, diethylene glycol divinyl ether, diethylene glycol dimethacrylate, ethylene glycol diacrylate, neopentyl glycol dimethacrylate, pentaerythritol tetra- and trimethacrylates, allyl acrylate, divinyl ketone, N,N'-methylenediacrylimide, N,N'-methylenedimethacrylimide, N,N'-ethylenediacrylimide, diallyl maleate, diallyl fumarate, diallyl succinate, diallyl carbonate, diallyl malonate, diallyl oxalate, diallyl adipate, diallyl sebacate, diallyl tartrate, diallyl tricarballylate, triallyl aconitate, triallyl citrate; and the polyallyl and polyvinyl ethers of glycol, glycerol and pentaerythritol, bisphenol-A dimethacrylate, the polyallyl and polyvinyl ethers of resorcinol, and the like, and mixtures thereof. Preferred crosslinking monomers are divinylbenzene, trimethylolpropane trimethacrylate, trimethylolpropane triacrylate, hexamethylene-bis-methacrylamide and diethylene glycol divinyl ether and mixtures thereof. The crosslinking monomer is present at a level from 0.1 to 50 percent, preferably from 5 to 40 percent, most preferably from 5 to 20 percent, by weight, of the total monomer mixture.

Other, non-water-soluble monomers may be present in a minor amount in the monomer mixture; that is, they may be present at less than 50% by weight of the total monomer mixture. Such non-water-soluble monomers are preferably present at less than 25% by weight of the total monomer mixture. The non-water-soluble monomers useful in the present invention include those which are copolymerizable with the combination of the water-soluble monomer and the crosslinking monomer. These include both aromatic and aliphatic monomers having monoethylenic unsaturation, including those which are substituted with functional groups other than the ethylenic groups.

Polymerization initiators useful in the present invention include monomer-soluble initiators such as peroxides, hydroperoxides and related initiators, as for example benzoyl peroxide, tert-butyl hydroperoxide, cumene peroxide, tetralin peroxide, acetyl peroxide, caproyl peroxide, tert-butyl perbenzoate, tert-butyl diperphthalate, methyl ethyl ketone peroxide and the like. Also useful are azo initiators such as azodiisobutyronitrile, azodiisobutyramide, 2,2'-azo-bis-(2,4-dimethylvaleronitrile), azo-bis-(α-methylbutyronitrile) and dimethyl, diethyl or dibutyl azo-bis-(methylvalerate). The initiators are used at a level of from 0.01 to 10% by weight, based on the total weight of the monomers; preferably the peroxide initiators are used at a level of from 0.01% to 3% by weight, based on the total weight of the monomers, and preferably the azo initiators are used at a level from 0.01% to 2% by weight, based on the total weight of the monomers. Preferred initiators are the azo initiators, and particularly preferred is 2,2'-azo-bis-(2,4-dimethylvaleronitrile).

As previously expressed, salts have been used in the art to reduce the solubility of the water-soluble monomer in the organic phase. It has surprising been found that the no-salt embodiment of the present process produces polymeric compounds without the need for a salt to reduce the solubility of the water-soluble monomer in the aqueous phase.

As previously expressed, salts have been used in the art to reduce the solubility of the water-soluble monomer in the organic phase, however some salts have been found to be problematic because they cause corrosion of the reaction equipment or generate polymers having reduced surface area. In the mixed-salt embodiment of the present process, specific combinations of salts of the invention have been found to be non-corrosive and have increased surface area. Such suitable salt combinations include but are not limited to sodium nitrite combined with at least one of the following salts: sodium bicarbonate, sodium sulphate, potassium bicarbonate, potassium sulphate, magnesium bicarbonate, magnesium sulphate, calcium bicarbonate, sodium phosphate, and calcium sulphate. Preferably the salt combinations of the present invention are sodium nitrite combined with at least one of the following salts: sodium bicarbonate, sodium sulphate, sodium phosphate, potassium bicarbonate, and potassium sulphate. Sodium nitrite must be present in the salt combination of the present invention. Salt combinations are typically present in the aqueous phase at amounts from 1 to 20 weight percent based on total water charged, preferably 1 to 15 percent, most preferably 2-12 percent.

The suspending agents useful in the present invention are known to those of ordinary skill in the art. Suitable examples include but are not limited to gelatin, sodium carboxymethyl cellulose, hydroxy methyl ethyl cellulose, poly(acrylic acid), poly(methacrylic acid) and poly(diallyl dimethyl ammonium chloride).

The monomer phase forms spherical droplets within the aqueous phase; these are preferably kept suspended by agitation, but other techniques for maintaining suspension which will be readily apparent to those skilled in the art may be employed, as for example using a static mixer, or suspending the droplets in a liquid stream moving opposite to the direction in which the droplets tend to move by their density. The polymerization reaction occurs within the suspended monomer droplets, and is initiated by establishing a temperature in the droplet which is at least as great as the decomposition temperature of the polymerization initiator. A reasonable lower temperature for polymerization is about 50° C., which is above the decomposition temperature of many common initiators; one skilled in the art will realize that if an initiator is selected having a higher decomposition temperature than this, the minimum temperature will be chosen according to the decomposition temperature of the actual initiator used. The upper limit for the polymerization reaction is the boiling temperature of the suspending medium; the medium employed herein is aqueous, so at atmospheric pressure the maximum temperature will be 100° C., and higher temperatures may be used at higher pressures. A lower temperature may be advantageous to prevent decomposition of one or more of the monomers or the dispersant, or for other reasons which will be apparent to one skilled in the art.

The process of the present invention may be used for preparing both gel and macroporous resins. For the preparation of macroporous resins a porogen is commonly used. Porogens useful for making macroporous resins are well known to those skilled in the art; their nature and selection is discussed in, for example, U.S. Pat. No. 3,991,017. Porogens are substances in which the monomers are soluble but the resulting polymer is insoluble, and which will dissolve the monomers within the suspended droplet, without reacting with the other components of the polymerization mixture. Thus for the present process, sufficient porogen must remain within the suspended droplet to dissolve the monomer mixture at least partially, and to create the pores within the particle as the polymer forms. Preferred porogens of the present invention include but are not limited to methylal, methyl isobutyl ketone, methyl isobutyl carbinol, diisobutyl ketone, xylene, toluene, hexane, heptane, octane, isooctane, cyclohexane, cyclohexene, dimethylbenzene, ethylbenzene, cyclohexanone, dioctylphtalate or combinations thereof.

In the no-salt embodiments, for the preparation of gellular resins a solvent is commonly used although not necessary. Solvents known to those of ordinary skill in the art are used. Suitable examples include but are not limited to tetra hydro furan, toluene, octane, methyl isobutyl carbinol, and dioxane. Surprisingly, combinations of the foregoing have been found to produce macroporous resins when used together in the organic phase.

The porogen or solvent (if present) may be removed from the resultant polymer with solvent extraction procedures or by distillation process. Solvent extraction is typically performed with solvents known to those of skill in the art. Suitable examples include but are not limited to: methanol, ethanol, propanol or acetone. The resins formed may be separated from the aqueous phase by methods known to those of skill in the art.

The resins produced according to the method of the present invention have a surface area from 3 to 80 m2/g, a pore volume from 0.03 to 0.30 cm3/g, a micropore volume of 0.0005 to 0.0080 cm3/g, and a pore diameter from 100 to 400 Angstroms. All parameters are measured by BET theory. The resins of the present invention may be used as catalysts in various reactions, including but not limited to carbonylation reactions.

Advantageously, in the mixed-salt embodiment, the mixed salt combinations of the present invention were found to have an increased BET nitrogen adsorption rate which gives indication of accessiblility of internal surface area of the polymeric resin as compared to individual salts. One would expect that this increased accessibility would lead to more effective catalysts due to the ability for more effective metal loading and distribution within the resin matrix and easier diffusion of reactants and products in and out of the resin matrix. In the present invention the ratio of surface area to the time to complete the BET portion of the isotherm are indicative of the accessiblility of internal surface area and relative cleanliness of the resultant resin. Ratio values of 6.7 or greater are considered indicative of cleanliness, and is deemed clean, while ratios less than 6.7 are considered to be unfavorable. Thus a salt combination of the present invention having ratio value of 6.7 or greater will both be non corrosive and cleaner and thus advantageous over other individual salts or mixtures without sodium nitrite.

Surface area, pore volume, micropore volume, and pore diameter measurements are obtained by BET theory; specifically within the present examples, the test method is as follows: 0.20 to 025 g of resin previously dried at 105° C. were transferred into sample tubes and degassed and further dried at 105° C. under vacuum (50 μm) for a minimum of 1 night. After reweighing, the degassed samples were placed on a Micromeritics Tri Star 3000 Surface Area and Porosity Analyzer porosimeter. The $N_2$ isotherms were obtained using 53 points with relative pressures from 0.01 to 0.998 on the adsorption curve and 45 points with relative pressures from 0.998 to 0.05 on the desorption curve. The surface area using the BET technique was obtained for points with relative pressures from 0.06 to 0.20. The total pore volume was obtained from the maximum quantity of gas adsorbed at a relative pressure of 0.998. The micropore volume was estimated from a t-plot analysis. The mean diameter as calculated by 4V/A is the diameter of a uniform cylinder which would have the same total pore volume and surface area. Two elapsed times were extracted: the time to complete the BET portion of the isotherm (11 points to a relative pressure of 0.20) and to reach the total pore volume (53 points to a relative pressure of 0.998). These times are measured relative to the first reference pressure measurement, which occurs at the end of a 1 to 2 hr instrument initialization sequence. It was not possible to use the total time for the analysis since it was frequently necessary to interrupt the analysis to refill the liquid $N_2$ Dewar flask, which introduces an unrecorded delay into the total elapsed time.

The following examples are intended to illustrate the invention and not to limit it except as it is limited in the claims. All ratios and percentages given herein are by weight

EXAMPLES

Comparative Examples 1-3 and Mixed-Salt Examples MS-1 and MS-2: Synthesis of poly (4-vinyl pyridine-co-divinyl benzene) Macroporous Resin Aqueous phase formulation was achieved by charging 720 g of water and 2.4 g of Pharmagel™, a commercial gelatin suspending agent available from PHARMAGEL ENGINEERING SPA, and heating for 2 hours at 50° C. The reactor was cooled to room temperature. Salts were added to the reactor and mixed prior to charging the organic phase. (See Table 2 below for salt charges for Comparative Examples 1-3 and Examples 1 and 2). The reactor was stirred for 30 minutes prior to charging the organic phase. The organic phase was made by mixing the following reactives: 180 g divinyl benzene (63%), 198 g 4-vinyl pyridine, 47 g of toluene, 23 g of n-octane, 4 g dibenzoyldiphenyl peroxide and 1 g 2,2'-azobis(2,4-dimethyl valeronitrile). The organic phase was mixed until complete dissolution of the initiators. The organic phase was then charged to a reactor and dispersed at 180 rpm at room temperature for 60 minutes. The reactor was heated and maintained at 70° C. for 4 hours and heated to 90° C. and held for 6 hours. Distillation was performed for 10 hours at reflux conditions adding water to maintain the liquid level in the reactor. The resin was then washed in a backwash column upflow for 24 hours at 40° C. to remove fines and residuals from the resin made. Sample was then taken for analysis. Corrosion results are expected in accordance with Table 1.

TABLE 1

| | Salt(s) used | Salt(s) (%-w to total water charged) | Corrosion |
|---|---|---|---|
| Comp. Example 1 | NaCl | 10.0 | Yes |
| Comp. Example 2 | NaNO$_2$ | 10.0 | No |
| Comp. Example 3 | NaHCO$_3$ | 10.0 | No |
| Example MS-1 | NaHCO$_3$ + NaNO$_2$ | 5.0 + 2.5 | No |
| Example MS-2 | Na$_2$SO$_4$ + NaNO$_2$ | 5.0 + 2.5 | No |

TABLE 2

| Sample | Salt Used | BET SA cm3/g | Total PV cm3/g | u PV cm3/g | Pore Diam. A |
|---|---|---|---|---|---|
| Comp. Ex. 1 | NaCl | 49 | 0.193 | 0.0028 | 156.5 |
| Comp. Ex. 2 | NaNO2 | 10 | 0.1173 | 0.0021 | 237.5 |
| Comp. Ex. 3 | NaHCO3 | 59 | 0.2418 | 0.0052 | 163.5 |
| Example MS-1 | NaHCO3 + NaNO2 | 63 | 0.2211 | 0.0045 | 141.0 |
| Example MS-2 | Na2SO4/NaNO2 | 48 | 0.2616 | 0.0039 | 219.7 |

| Sample | Salt Used | Surface Area (m2/g) | t_BET (h) | Ratio Surface Area:t_BET |
|---|---|---|---|---|
| Comp. Ex. 1 | NaCl | 49 | 5.57 | 8.8 |
| Comp. Ex. 2 | NaNO2 | 10 | 1.57 | 6.4 |
| Comp. Ex. 3 | NaHCO3 | 59 | 12.12 | 4.9 |
| Example MS-1 | NaHCO3 + NaNO2 | 63 | 7.33 | 8.6 |
| Example MS-2 | Na2SO4 + NaNO2 | 48 | 6.05 | 7.9 |

(*) A larger ratio corresponds to better results.
(**) Improved surface area with the NaHCO3 and NaHCO3/NaNO2 mixed salt chemistry.

Example 3: Synthesis of poly(4-vinyl pyridine-co-divinyl benzene) Macroporous Resin Aqueous phase formulation was achieved by charging 720 g of water and 2.4 g of PADMAC™ and heating for 2 hours at 50° C. The reactor was cooled to room temperature. NaHCO3 (5%) and NaNO$_2$ (1%) were added to the reactor and mixed prior to charging the organic phase. (See Table 3 below for salt charges for Example 3). The reactor was stirred for 30 minutes prior to charging the organic phase. The organic phase was made by mixing the following reactives: 180 g divinyl benzene (63%), 198 g 4-vinyl pyridine, 47 g of toluene, 23 g of n-octane, 4 g Diphenyl peroxide and 1 g 2,2'-azobis(2,4-dimethyl valeronitrile). The organic phase was mixed until complete dissolution of the initiators. The organic phase was then charged to a reactor and dispersed at 180 rpm at room temperature for 60 minutes. The reactor was heated and maintained at 70° C. for 4 hours and heated to 90° C. and held for 6 hours. Distillation was performed for 10 hours at reflux conditions adding water to maintain the liquid level in the reactor. The resin was then washed in a backwash column upflow for 24 hours at 40° C. to remove fines and residuals from the resin made. Sample was then taken for analysis.

TABLE 3

| Sample | Salt Used with PADMAC suspending agent | BET SA cm3/g | Total PV cm3/g | u PV cm3/g | Pore Diam. A |
|---|---|---|---|---|---|
| Example 3 | NaHCO3 and NaNO2 | 63.4 | 0.2384 | 0.0050 | 159.5 |

TABLE 4

| Sample | Salt Used | Surface Area (m2/g) | t_BET (h) | Ratio Surface Area:t_BET (*) |
|---|---|---|---|---|
| Example 3 | NaHCO3 and NaNO2 | 63.4 | 7:53 | 8.04 |

*BET SA—Surface area as measured by BET
Total PV—Total pore volume as measured by BET
μPV—Micro pore volume as measured by BET
Pore Diam—Pore Diameter as measured by BET
t—time to complete the BET portion of the isotherm

No-Salt Example NS-1: Synthesis of poly (4-vinyl pyridine-co-divinyl penzene) Macroporous Resin Aqueous phase formulation was achieved by charging 720 g of water and 2.4 g of Pharmagel™, a commercial gelatin suspending agent available from PHARMAGEL ENGINEERING SPA, and heating for 2 hours at 50° C. The reactor was cooled to room temperature. The reactor was stirred for 30 minutes prior to charging the organic phase. The organic phase was made by mixing the following reactives: 180 g divinyl benzene (63%), 198 g 4-vinyl pyridine, 47 g of toluene, 23 g of n-octane, 4 g dibenzoyl peroxide and 1 g 2,2'-azobis(2,4-dimethyl valeronitrile). The organic phase was mixed until complete dissolution of the initiators. The organic phase was then charged to a reactor and dispersed at 180 rpm at room temperature for 60 minutes. The reactor was heated and maintained at 70° C. for 4 hours and heated to 90° C. and held for 6 hours. Distillation was performed for 10 hours at reflux conditions adding water to maintain the liquid level in the reactor. The resin was then washed in a backwash column upflow for 24 hours at 40° C. to remove fines and residuals from the resin made. Sample was then taken for analysis.

No-Salt Example NS-2: Synthesis of poly (4-vinyl pyridine-co-divinyl benzene) Gellular Resin Aqueous phase formulation was achieved by charging 720 g of water and 2.4 g of Pharmagel™ and heating for 2 hours at 50° C. The reactor was cooled to room temperature. The reactor was stirred for 30 minutes prior to charging the organic phase. The organic phase was made by mixing the following reactives: 180 g divinyl benzene (63%), 198 g 4-Vinyl Pyridine, 70 g of toluene, 4 g dibenzoyl peroxide and 1 g 2,2'-azobis(2,4-dimethyl valeronitrile). The organic phase was mixed until complete dissolution of the initiators. The organic phase was then charged to a reactor and dispersed at 180 rpm at room temperature for 60 minutes. The reactor was heated and maintained at 70° C. for 4 hours and heated to 90° C. and held for 6 hours. Distillation was performed for 10 hours at reflux conditions adding water to maintain the liquid level in the reactor. The resin was then washed in a backwash column upflow for 24 hours at 40° C. to remove fines and residuals from the resin obtained. A sample was then taken for analysis.

No-Salt Example NS-3: Synthesis of poly (N,N'dimethyl ethyl amine methacrylic acid ester-co divinyl benzene)—Gellular Resin with (Methacrylic Acid Ester Ethyl Dimethyl Amine)

Aqueous phase formulation was achieved by charging 720 g of water, 2.4 g of Pharmagel™ and heating for 2 hours at 50° C. The reactor was cooled to room temperature. The reactor was stirred for 30 minutes prior to charging the organic phase. The organic phase was made by mixing the following reactives: 180 g divinyl benzene (63%), 198 g 2-(dimethylamino)ethyl methacrylate, 70 g toluene, 4 g dibenzoyl peroxide and 1 g of 2,2'-azobis(2,4-dimethyl valeronitrile). The organic phase was mixed until complete dissolution of the initiators. The organic phase was then charged to a reactor and dispersed at 180 rpm at room temperature for 60 minutes. The reactor was heated and maintained at 70° C. for 4 hours and heated to 90° C. and held for 6 hours. Distillation was performed for 10 hours at reflux conditions and water was added to maintain the liquid level in the reactor. The resin was then washed in a backwash column upflow for 24 hours at 40° C. to remove fines and residuals from the resin made. A sample was then taken for analysis.

No-Salt Example NS-4: Synthesis of poly (4-vinyl pyridine-co-styrene-divinylbenzene) Macroporous Resin with Styrene Aqueous phase formulation was achieved by charging 720 g of water, 2.4 g of Pharmagel™ and heating for 2 hours at 50° C. The reactor was cooled to room temperature. The reactor was stirred for 30 minutes prior to charging the organic phase. The organic phase was made by mixing the following reactives: 168 g divinyl benzene (63%), 198 g 4-vinyl pyridine, 30 g styrene, 35 g n-octane, 35 g toluene, 4 g dibenzoyl peroxide and 1 g of 2,2'-azobis(2,4-dimethyl valeronitrile). The organic phase was mixed until complete dissolution of the initiators. The organic phase was then charged to a reactor and dispersed at 180 rpm at room temperature for 60 minutes. The reactor was heated and maintained at 70° C. for 4 hours and heated to 90° C. and held for 6 hours. Distillation was performed for 10 hours at reflux conditions and water was added to maintain the liquid level in the reactor. The resin was then washed in a backwash column upflow for 24 hours at 40° C. to remove fines and residuals from the resin made. A sample was then taken for analysis.

Comparative Example 11: Synthesis of poly (4-vinyl pyridine-co-divinyl benzene) Macroporous Resin with Salt Aqueous phase formulation was achieved by charging 720 g of water, 2.4 g of Pharmagel™ and 10% sodium chloride (72 g) and heating for 2 hours at 50° C. The reactor was cooled to room temperature. The reactor was stirred for 30 minutes prior to charging the organic phase. The organic phase was made by mixing the following reactives: 180 g divinyl benzene (63%), 198 g 4-vinyl pyridine, 47 g of toluene, 23 g of n-octane, 4 g dibenzoyl peroxide and 1 g 2,2'-azobis(2,4-dimethyl valeronitrile). The organic phase was mixed until complete dissolution of the initiators. The organic phase was then charged to a reactor and dispersed at 180 rpm at room temperature for 60 minutes. The reactor was heated and maintained at 70° C. for 4 hours and heated to 90° C. and held for 6 hours. Distillation was performed for 10 hours at reflux conditions adding water to maintain the liquid level in the reactor. The resin was then washed in a backwash column upflow for 24 hours at 40° C. to remove fines and residuals from the resin made. Sample was then taken for analysis.

TABLE 11

| Sample | Salt Used | BET SA cm3/g | Total PV cm3/g | u PV cm3/g | 4V/A Diam. A |
|---|---|---|---|---|---|
| Compar. Ex. 11 | NaCl | 49 | 0.193 | 0.0028 | 156.5 |
| Example NS-1 | No Salt | 49 | 0.187 | 0.0042 | 184.1 |
| Example NS-4 | No Salt | 50 | 0.155 | 0.0025 | 125.4 |

We claim:

1. A process for preparing a resin by suspension polymerization comprising:
   i) forming an aqueous suspension, wherein the aqueous suspension comprises an aqueous phase and an organic phase, wherein the organic phase comprises:
      a) a monomer phase;
      b) from 0.1 to 5 weight percent of a polymerization initiator; and
   wherein the monomer phase comprises at least 50 weight percent of vinyl pyridine and from 0.1 to 50 weight percent of divinylbenzene;
   ii) establishing polymerization conditions in the suspension,
   iii) allowing the monomers to polymerize until they have formed water-insoluble particles, and
   iv) separating the particles from the aqueous phase;
   further wherein the aqueous phase comprises water and also comprises a mixture comprising from about 1 to about 2.5 weight percent sodium nitrite and about 5 weight percent sodium bicarbonate, based on the water in the aqueous phase.

2. The process of claim 1 wherein the suspending agent is poly (diallyl dimethyl ammonium chloride) or gelatin.

* * * * *